(12) United States Patent
Usami

(10) Patent No.: US 6,930,576 B2
(45) Date of Patent: Aug. 16, 2005

(54) ELECTROMAGNETIC SWITCH FOR STARTERS

(75) Inventor: Shinji Usami, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/338,752

(22) Filed: Jan. 9, 2003

(65) Prior Publication Data

US 2003/0128088 A1 Jul. 10, 2003

(30) Foreign Application Priority Data

Jan. 10, 2002 (JP) ........................................ 2002-003717

(51) Int. Cl.$^7$ ............................................. H01H 62/07
(52) U.S. Cl. ..................................... 335/126; 335/131
(58) Field of Search ................................ 335/126, 131, 335/313; 332/126; 385/126

(56) References Cited

U.S. PATENT DOCUMENTS

| | | | | |
|---|---|---|---|---|
| 4,243,964 A | * | 1/1981 | Bogner et al. ............... | 335/156 |
| 4,251,788 A | * | 2/1981 | Barthruff et al. ........... | 335/157 |
| 4,887,056 A | * | 12/1989 | Kajino et al. ............... | 335/126 |
| 5,015,980 A | * | 5/1991 | Sugiyama .................... | 335/126 |
| 5,023,581 A | * | 6/1991 | Sugiyama .................... | 335/126 |
| 5,256,992 A | * | 10/1993 | Fasola et al. ................ | 335/126 |
| 5,359,306 A | * | 10/1994 | Fasola et al. ................ | 335/126 |
| 5,521,566 A | * | 5/1996 | Krubsack et al. ........... | 335/126 |
| 5,663,699 A | * | 9/1997 | Shiroyama ................... | 335/126 |
| 5,677,656 A | * | 10/1997 | Mauch et al. ................ | 335/126 |
| 6,049,263 A | * | 4/2000 | Vilou .......................... | 335/126 |
| 6,204,742 B1 | | 3/2001 | Hisamoto et al. | |
| 6,307,454 B1 | * | 10/2001 | Quentric ..................... | 335/126 |
| 6,380,831 B1 | * | 4/2002 | Kajino ........................ | 335/127 |
| 6,404,310 B1 | * | 6/2002 | Ando et al. ................. | 335/133 |
| 6,484,742 B1 | * | 11/2002 | Brazier et al. ........... | 137/68.11 |
| 6,693,503 B1 | * | 2/2004 | Nguyen et al. ............. | 335/131 |

FOREIGN PATENT DOCUMENTS

JP  A 2000-322999  11/2000

* cited by examiner

*Primary Examiner*—Bernard Rojas
(74) *Attorney, Agent, or Firm*—Oliff & Berridge, PLC

(57) ABSTRACT

An electromagnetic switch for a starter is provided. In the switch, a switch case has an open end formed and a molding cap has two terminals connected electrically to external leads and a fitting end. The fitting end is mutually fitted to the open end of the switch case. A pair of fixed contacts is disposed inside the molding cap, each fixed contact being integrally secured to each terminal. A movable contact is movably disposed to face the pair of fixed contacts. An excitation coil generates a magnetic force necessary for driving the movable contact. Further, the switch case includes a winding-up belt piece integrally formed to a circumference of the open end to extend outwardly in its axial direction. The molding cap includes a circumferential groove formed on an outer surface of the fitting end of the molding cap, the winding-up belt piece winding up the whole circumferential groove.

9 Claims, 5 Drawing Sheets

ELECTROMAGNETIC SWITCH FOR STARTERS

BACKGROUND OF THE INVENTION

1. Field of the Invention

The present invention relates to an electromagnetic switch for starters.

2. Description of the Related Art

A conventional electromagnetic switch is provided by, for example, a U.S. Pat. No. 6,204,742 B1.

This electromagnetic switch has a construction in which a molding cap equipped with both of a motor terminal and a battery terminal is fastened to a switch case in the axial direction by caulking ends extending from the switch case. The caulking ends are made to locate at positions around an open end of the molding cap to be connected with the switch case. The caulking ends consist of two or more caulking portions arranged between the motor terminal and the battery terminal in the circumferential direction of the open end of the molding cap. This configuration of the caulking portions makes the electromagnetic switch compact, while still maintaining a larger center distance between the motor and battery terminals.

In the case of the foregoing conventional electromagnetic switch, however, connecting the molding cap and the switch case can be realized by means of only two or more caulking portions. That is, the molding cap is caulked partially, not caulked at the entire circumference of the molding cap. In this partial caulking structure, there is a possibility that the remaining circumferential connection portions other than the caulking portions may cause a slight gap between the connections of the switch case and the molding cap. If such a gap is formed between the switch case and the molding cap, there is a fear that foreign materials, such as moisture and dust may intrude into the switch through the gap.

In addition, if foreign materials remain in one or more apertures formed between the remaining circumferential connection portions other than the caulked portions and are deteriorated for a long time, the caulking pressure may be lowered from an initial amount. When the caulking pressure reduces unexpectedly, there may be caused a relative positional shift between the switch case and the molding cap. Such a positional shift, if any, will bring about a positional shift of a fixed contact from a movable contact in the molding cap. If such a case occurs, the movable contact is in contact with the fixed contact in a one-sided contact fashion, whereby the contacts may be worn away extraordinarily.

SUMMARY OF THE INVENTION

The present invention has been made to overcome the above various problems. An object of the present invention is to provide an electromagnetic switch for starters, which is able to not only make the switch (especially, the switch case) compact in the radial direction thereof but also surely prevent foreign materials from penetrating into the switch, while the central distance of two external terminals (motor and battery terminals) extending from the molding cap is kept to a larger amount.

In order to achieve the foregoing object, as one aspect of the present invention, there is provided an electromagnetic switch for a starter, comprising a switch case having an open end formed in an axial direction thereof; a molding cap having two terminals to be connected electrically to external leads, the two terminals being secured to the molding cap to run therethrough, and a fitting end formed in an axial direction of the molding cap, the fitting end mutually fitted to the open end of the switch case; a pair of fixed contacts disposed inside the molding cap, each of the fixed contacts being integrally secured to each of the two terminals; a movable contact movably disposed to face the pair of fixed contacts in a space formed between the switch case and the molding cap which are fitted to each other; and an excitation coil, disposed within the switch case, generating a magnetic force necessary for driving the movable contact. In this configuration, the switch case includes a winding-up belt piece integrally formed to a circumference of the open end so as to extend outwardly in the axial direction thereof. In addition, the molding cap includes a circumferential groove formed on an outer surface of the fitting end of the molding cap, the winding-up belt piece winding up the whole circumferential groove.

Accordingly, there will occur no aperture between the molding cap and the switch case which is fitted to each other. Hence foreign materials, such as moisture and dust, will be prevented from invading both of the molding cap and the switch case through the fitted portion between them.

In addition, since no aperture to admit the invasion of foreign dusts is formed between the molding cap and the switch case which are fitted to each other, such foreign dusts will never be charged therebetween. Hence the winding-up portion can be avoided from deteriorating, the winding-up force being kept to a proper amount. It is therefore preventable that the molding cap shifts in its relative position from the switch case. Thus, a one-sided contact of the movable contact to each of the fixed contacts can be prevented, whereby each of the contacts is released from being worn away extraordinarily due to the one-sided contact.

Preferably, the molding cap has a pair of terminal holders individually holds the two terminals, at least one of the terminal holders being outwardly disposed to protrude from an outer surface of the molding cap in a radial direction thereof. It is therefore possible to make the center distance between the two terminals larger, whereby a creepage distance of insulation between the two terminals can be set to an amount comparable to the conventional one, with the entire molding cap avoided from being made large in size.

Still preferably, the molding cap has a connector portion holing a current-supply terminal to supply current to the excitation coil, the connector portion being outwardly disposed to protrude from an outer surface of the molding cap in a radial direction thereof. The center distance between the current-supply terminal and each terminal electrically connected to each external lead can therefore be made larger. Hence, it is not required that the entire molding cap be enlarged in size in its radial direction, while the creepage distance of insulation between the current-supply terminal and each terminal to each external lead can be assigned to an amount equal to or larger than the conventional one.

It is still preferred that the molding cap is at least equal a radial outer-surface dimension to the switch case. Thus, the dimension of the outer diameter of the switch case can be avoided from being enlarged, while still setting to a larger center distance between the two terminals to the external leads.

Still preferred is that a seal member is inserted to seal a fitted portion of both the switch case and the molding cap, the seal member responding to a winding-up force applied to the winding-up belt piece in the radial direction so as to be pushed in the axial direction. Thus the fitted portion can be sealed in a secure manner thanks to the winding-up force to push the seal member.

It is also preferred that the winding-up belt piece is configured to be wound up by inserting a dedicated tool into the groove from outside the groove in the radial direction. Using such a dedicated tool allows the winding-up belt piece to be wound up in the groove in a secure and easy fashion.

DETAILED DESCRIPTION OF PREFERRED EMBODIMENTS

Preferred embodiments of the present invention will now be described with reference to accompanying drawings.

(First Embodiment)

Figure 1:
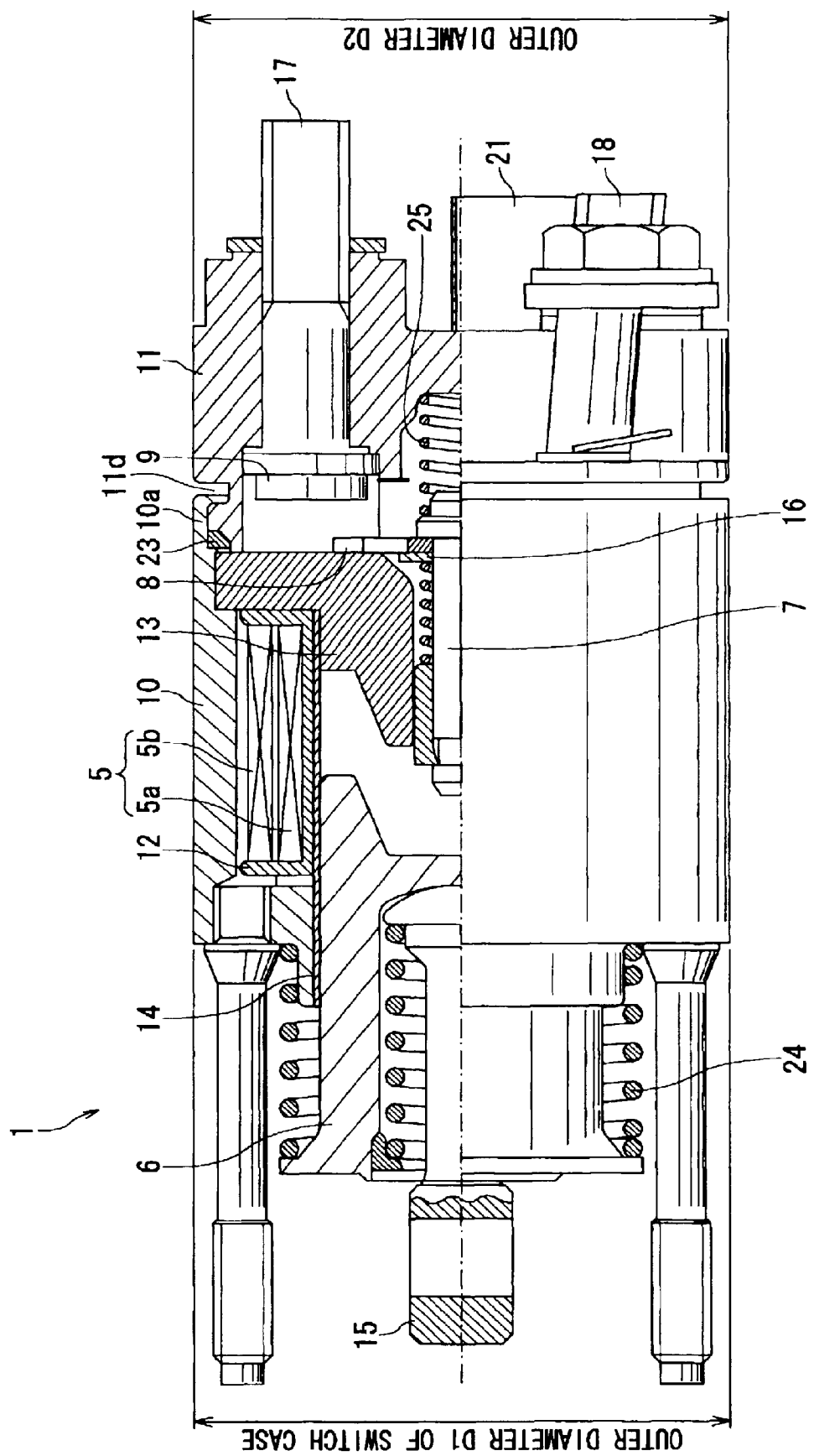
FIG. 1 is a side view, half in section, of an electromagnetic switch according to embodiments of the present invention.

FIG. 1 shows a side view of, section in half, an electromagnetic switch 1 for starters according to a first embodiment of the present invention, which is viewed in a radial direction thereof.

Figure 4:
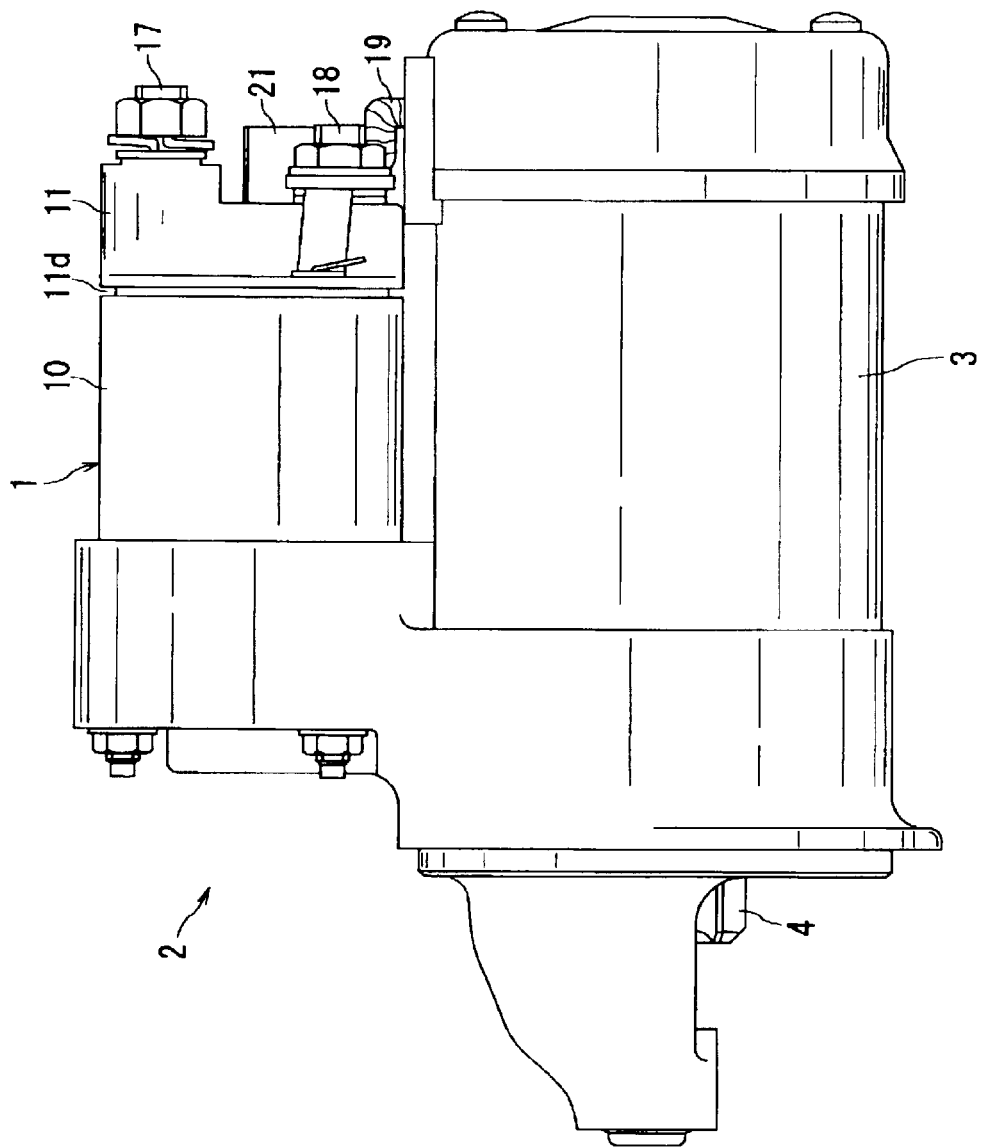
FIG. 4 is a side view showing the electromagnetic switch entirely.

This electromagnetic switch 1 is used together with, for instance, a starter 2, as shown in FIG. 4. This electromagnetic switch 1 is mounted to the starter 2 so that both of the switch 1 and a starter motor 3 of the starter 2 are arranged in parallel to each other. The electromagnetic switch 1 is in charge of on/off control of current to be supplied to the starter motor 3 and drive of a not-shown shift lever to push out a pinion gear 4 axially outward (toward the left in FIG. 4).

Since the construction and operations of the starter 2 are well known, the explanation thereof will be omitted here.

As shown in FIG. 1, the electromagnetic switch 1 includes an excitation coil 5, plunger 6, rod 7, movable contact 8, and a pair of fixed contact 9, all of which will be discussed later, and contained in both of a switch case 10 and a molding cap 11.

The excitation coil 5 is composed of a suction coil 5a and a holding coil 5b and contained in the switch case 10. Both of the coils 5a and 5b are wound around a bobbin 12 to form a double layer structure.

The switch case 10 is responsible for containing a magnetic circuit for the excitation coil 5, together with a stator core 13 placed in the switch case 10.

The plunger 6 is inserted in a bore of the bobbin 12 in a slidable manner along a cylindrical sleeve 14, serving as a guide member, placed on the bore thereof. The plunger 6 is located to face the starter core 13 in the axial direction (i.e., the right and left direction in FIG. 1). A hook 15 operatively liking to the foregoing shift lever is built to the plunger 6.

The rod 7, placed movably in the axial direction with passing a hollow portion of the starter core 13, can be moved responsively to a movement of the plunger 6. Specifically, when the plunger 6 is sucked axially inward responsively to a magnetic force from the excitation coil 5, the plunger 6 comes in contact with the rod 7 during its inward movement, resulting in that the rod 7 is forced to move together with the plunger 6 as one unit.

The movable contact 8, formed into a hollow disk having a radius that allows the disk to be fitted to the outer circumferential portion of the rod 7, is held on one side of the rod 7 (i.e., the opposite side to the plunger) with an insulation member 16 therebetween. Thus, the movable contact 8 can be moved together with rod 7 in the axial direction.

On the other hand, each contact of the one pair of fixed contacts 9 is arranged to face the movable contact 8 in the axial direction within the molding cap 11. The fixed contacts 9 are respectively fixed on the ends of two terminal bolts 17 and 18 each secured to the molding cap 11 so that the bolts 17 and 18 penetrate the molding cap 11.

Figure 2:
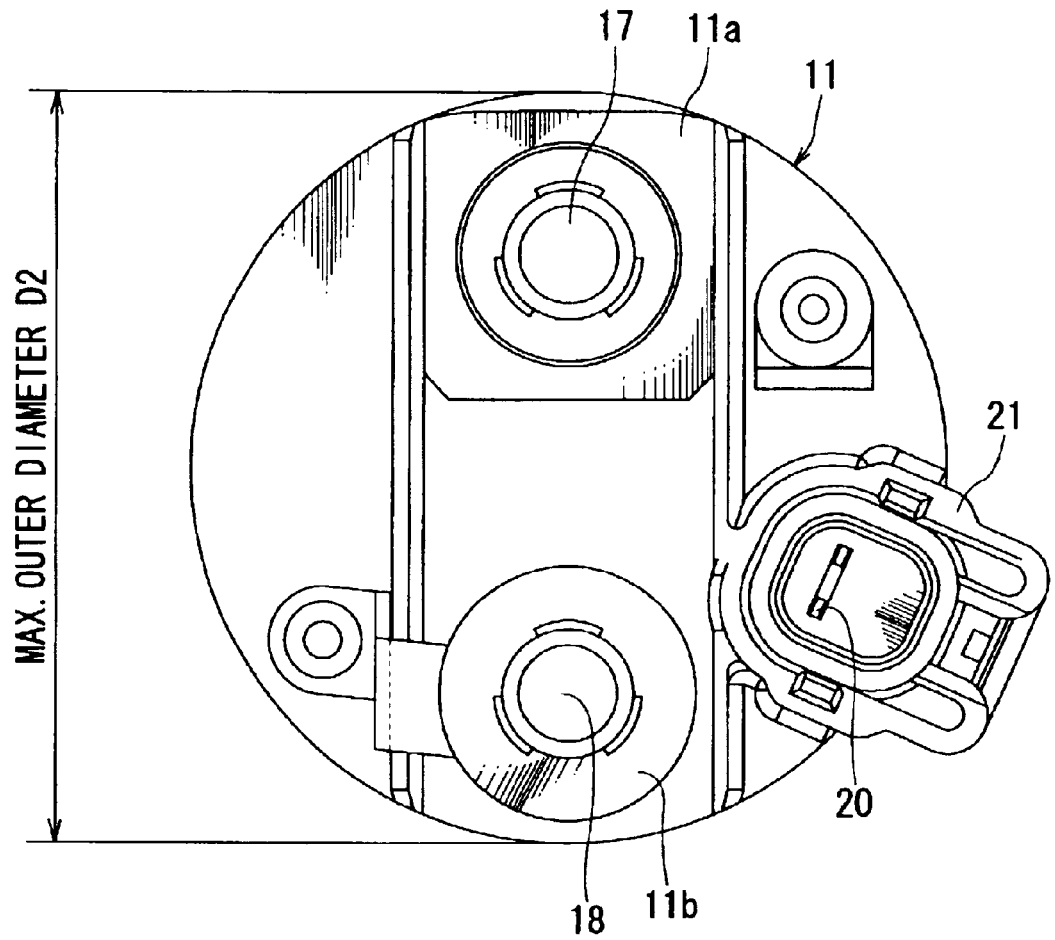
FIG. 2 is a frontal view of an electromagnetic switch according to a first embodiment of the present invention, when viewed in the axial direction thereof.

Of the two terminal bolts 17 and 18, one terminal bolt 17 is a B-terminal (called battery terminal) connected, by way of a not-shown battery cable, to a battery mounted on a vehicle and the other terminal 18 is an M-terminal (called motor terminal) connected to a starter motor 3 through a lead 19 (refer to FIG. 4). As shown in FIG. 2, both of the terminals 17 and 18 are disposed on the molding cap 11 with a predetermined center distance secured therebetween in the diameter direction of the molding cap 11.

The switch case 10 has an open end at one axial end thereof (on the right side in FIG. 1), into which the molding cap 11 is inserted. A thin-walled winding-up belt piece 10a, which is integrally formed with the switch case 10, is provided so as to extend from around the open end.

Figure 3:
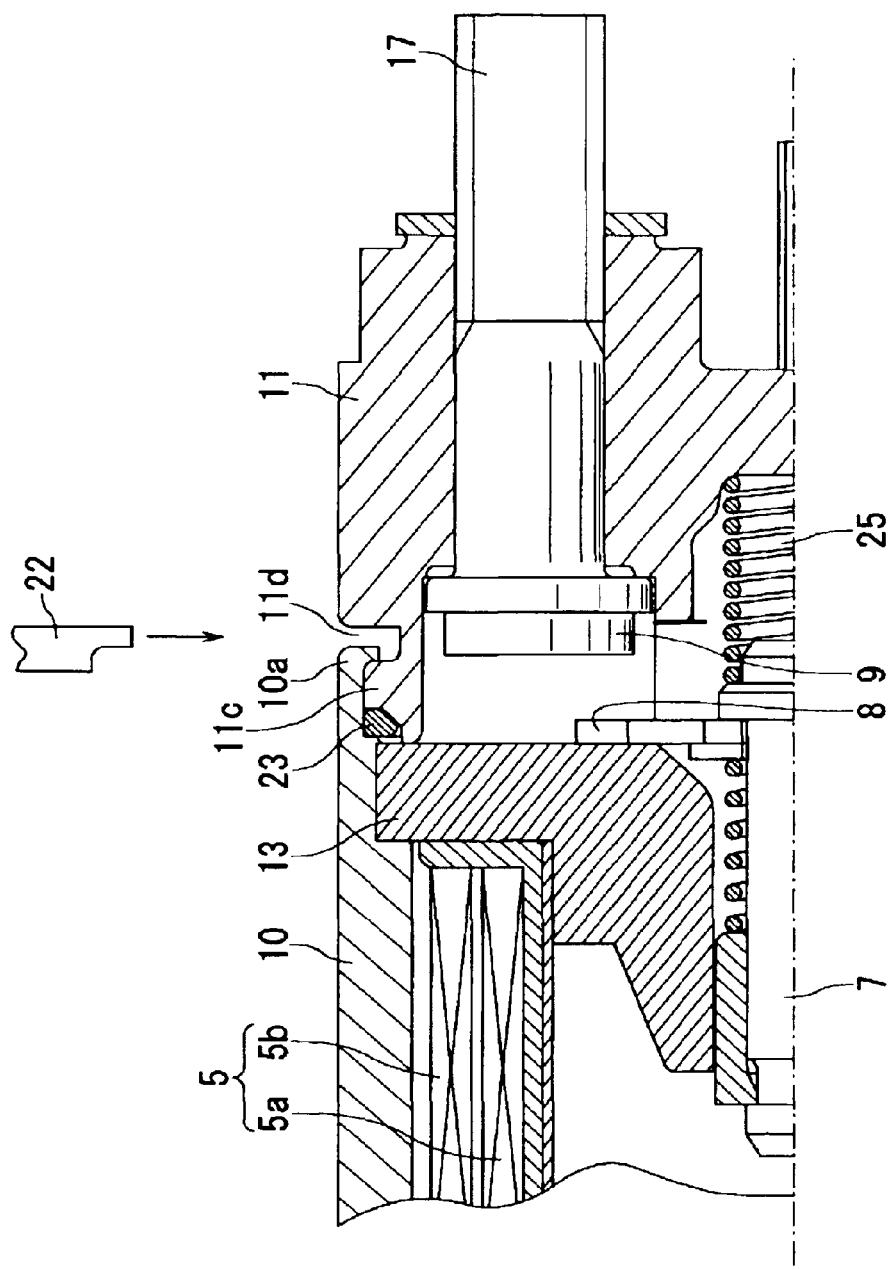
FIG. 3 is a partial cross-sectional view showing a connected part of a switch case and a molding cap, the connection part including a winding-up portion thereof.

As illustrated in FIG. 2, the molding cap 11, which is made of resin, has not only a pair of terminal holders 11a and 11b holding the terminal bolts 17 and 18, respectively, but also a connector portion 21 holding a current-supply terminal 20 to supply current to the excitation coil 5. In addition, the molding cap 11 includes a contact-side circular end 11c (refer to FIG. 3) which is inserted in the foregoing open end of the switch case 10 as depicted in FIGS. 1 and 3. The contact-side circular end 11c is partitioned by a ring-like groove 11d formed on the outer surface of the molding cap 11.

The molding cap 11 is fixedly connected with the switch case 10 in the axial direction thereof in such a manner that the contact-side circular end 11c of the molding cap 11 is inserted into the open end of the switch case 10, and then a dedicated winding-up fitting 22 is used to wind up the winding-up belt piece 10a around the groove 11d radially inward.

Incidentally, because it is required that the contact-side circular end 11c of the molding cap 11 be inserted into the open end of the switch case 10, the diameter of the contact-side circular end 11c is less than the diameter D1 of the switch case 10. In contrast, the outer diameter D2 of the molding cap 11, which protrudes outwardly in the axial direction from the switch case 10 when connected thereto, is set to an amount equal to or more than the outer diameter D1 of the switch case 10, as shown in FIG. 1 (i.e., D1≦D2).

As shown in FIG. 3, between portions to be fitted mutually between both of the switch case 10 and the molding cap 11, a seal member 23, such as a rubber-made O-ring, is inserted. This seal member 23 is located on the obliquely-formed tip edge of the contact-side circular end 11c (refer to FIG. 3), which is nearer to the tip than the groove 11d.

Accordingly, a winding-up force applied in the radial direction by the winding-up belt piece 10a pushes axially the seal member 23 to function as a sealer to the fitted portions.

The operations of this electromagnetic switch 1 will now be described.

When a not-shown ignition switch is turned on to energize the excitation coil 5, the excitation coil 5 will generates a magnetic force to pull the plunger 6 toward the starter core 13.

The plunger 6 will involves the rod 7 during its movement so that the plunger 6 forcibly pushes the rod 7 to move together, resulting in that the movable contact 8 held on the end of the rod 7 comes into contact with the pair of fixed contacts 9.

This contact allows the pair of fixed contacts 9 to electrically be connected with each other through the movable contact 8, whereby a current-supply circuit for the starter motor 3 is brought into its closed state. Thus current is therefore provided to the starter motor 3.

When the current supply to the excitation coil 5 is stopped after the engine starts, the magnetic force disappears. This causes a return spring 24 (refer to FIG. 1) to be activated, so that the plunger 6 is pushed back responsively to a reaction force of the spring 24. The rod 7 is also pushed back by a spring 25 biasing the rod 7. As a result of it, the movable contact 8 is made to separate from the pair of fixed contacts 9, opening the current supply circuit for the starter motor 3. Thus the current is stopped from being supplied to the starter motor 3 any more.

The advantages of the present embodiment will now be described.

In the present embodiment, the molding cap 11 has the contact-side circular end 11c. The groove 11d is formed on the outer circumferential surface of the contact-side circular end 11c to be inserted into the opening end of the switch case 10. And the molding cap 11 is secured to the switch case 10 by winding up the winding-up belt piece 10a of the switch case 10 around on the groove 11d.

Accordingly, this winding-up structure can be realized on the circumference of the one end of molding cap 11, not the partial caulking structure in the circumferential direction, unlike the conventional. No aperture, including partial apertures as shown in the conventional, are formed between the switch case 10 and the molding cap 11 in the circumferential direction. Hence foreign materials, such as moisture and dust, will be prevented from invading the electromagnetic switch 1 through the fitted portion between the molding cap 11 and the switch case 10.

Additionally, since no aperture to admit the invasion of foreign dusts is formed between the molding cap 11 and the switch case 10 which are fitted to each other, such foreign dusts will never be charged therebetween. Hence the winding-up portion can be avoided from deteriorating, thus the winding-up force being kept to a proper amount. It is therefore preventable that the molding cap 11 shifts in its relative position from the switch case 10. Thus, a one-sided contact of the movable contact 8 to each of the fixed contacts 9 can be prevented, whereby each of the contacts is released from being worn away extraordinarily due to the one-sided contact.

Moreover, the molding cap 11 has the contact-side circular end 11c (to be inserted into the switch case 10) of which outer radial diameter is less than the outer radial diameter D1 of the switch case 10, but has the other end (to be located outside the switch case 10) of which outer radial diameter D2 is equal to or larger than the diameter D1 of the switch case 10. This dimensional relationships allow the center distance between the two terminal bolts 17 and 18 to be set to a larger amount, even without making the outer diameter D1 of the switch case 10 larger. In other words, even if such center distance is set to a greater amount, the electromagnetic switch 1 whose switch case 10 having a smaller diameter D1 can be provided.

The seal member 23 disposed at the fitted portion of both the molding cap 11 and the switch case 10 is positioned nearer, than the groove 11d, to one end of the molding cap 11 and is axially pushed responsively to a winding-up force applied to the winding-up belt piece 10a. This pushing structure makes it possible that the fitted portion is sealed with steadiness.

(Second Embodiment)

Figure 5:
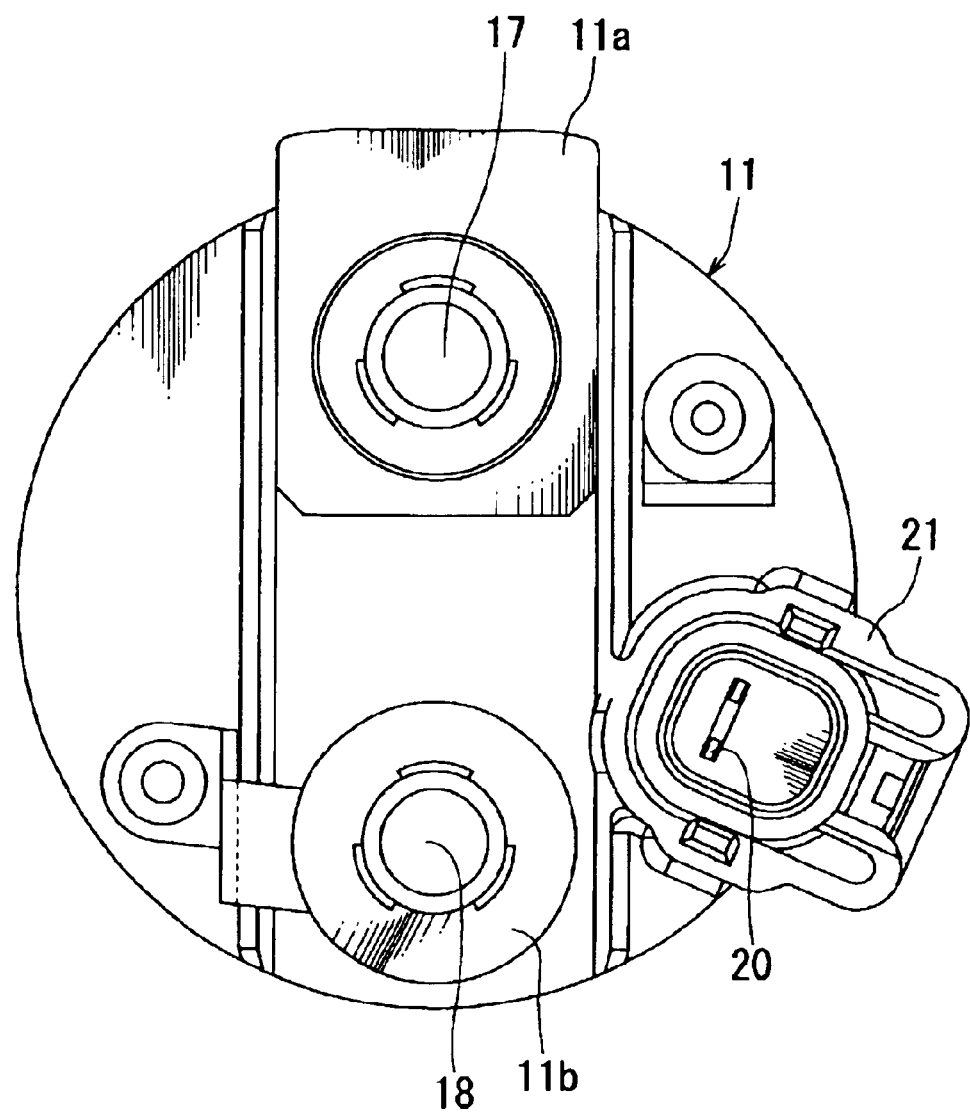
FIG. 5 is a frontal view of an electromagnetic switch according to a second embodiment of the present invention, when viewed in the axial direction thereof.

Referring to FIG. 5, a second embodiment of the present invention will now be described. In this embodiment, the identical components to those described in the first embodiment will be assigned to the same reference numerals, in which their explanations will be omitted.

FIG. 5 is a frontal view of an electromagnetic switch 1, which is obtained when viewed in the axial direction (i.e., when axially viewed toward the molding cap 11).

In the second embodiment, the molding cap 11 has a pair of terminal holders 11a and 11b. Of these terminal holders, at least one terminal holder (in FIG. 5, the terminal holder 11a functioning as the B-terminal) is arranged so as to protrude outwardly in the radial direction from the outer surface of the molding cap 11.

Hence, even compared to the structure in the foregoing first embodiment, the center distance between the two terminal bolts 17 and 18 can be made greater. It is therefore possible that, with the entire molding cap 11 kept to a relatively compact size in the radial direction thereof, a creepage distance of insulation between the two terminal bolts 17 and 18 can be set to an amount comparable to the conventional.

As shown in FIGS. 2 and 5, the electromagnetic switch 1 according to each of the first and second embodiments provides the structure in which the connector portion 21, which holds the current-supply terminal 20 for the excitation coil 5, is arranged to protrude outwardly from the outer surface of the molding cap 11 in the radial direction. This is effective for setting a larger creepage distance of insulation between each terminal bolt 17 (18) and the current-supply terminal 20. Accordingly, with the radial size of the entire molding cap 11 avoided from becoming larger, the creepage distance of insulation which is as large or comparable to as the conventional can be assured.

The present invention may be embodied in several other forms without departing from the spirit thereof. The present embodiments as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An electromagnetic switch for a starter, comprising:
    a switch case defining an axial direction and having a cylindrical outer surface providing a cylindrical open end formed to open in the axial direction and to have both a cylindrical distal end and an inner bottom;
    a cap defining an axial direction and having a cylindrical outer surface of which one end serves as a cylindrical fitting end on the outer surface on which an annular groove is formed to completely surround the cylindrical fitting end in a circumferential direction thereof and to divide the cylindrical fitting end from the cylindrical outer surface of the cap, the cylindrical fitting end being smaller in diameter than the cylindrical outer surface of the cap and having a circumferential outer edge on which an oblique surface which is oblique to the axial direction of the cap is formed, and the cylindrical outer surface of the cap being at least equal in diameter to the cylindrical outer surface of the switch case, the cap being fixed with the switch case by inserting the cylindrical fitting end of the cap into the cylindrical open end of the switch case so that the distal end of the cylindrical open end of the switch case is located over the annular groove on the cylindrical fitting end of the cap and the cylindrical fitting end is stopped by the inner bottom of the cylindrical open end of the switch case and radial-inwardly deforming the distal end into the groove so that the distal end is fixed with the groove; and a seal member is inserted between a peripheral periphery of the inner bottom of the cylindrical open end and the circumferential outer edge of the cylindrical fitting end and is forcibly pushed onto the oblique surface in the axial direction when a force is applied to the distal end of the cylindrical open end of the switch case in the radial direction during the radial-inward deforming assembling operation performed with the distal end.

2. The electromagnetic switch according to claim 1, wherein the cap accommodates two terminals to be connected electrically to external leads, the two terminals being secured to the cap to run therethrough in the axial direction of the cap;

the cylindrical fitting end of the cap is fixed with the cylindrical open end of the switch case to form a cavity inside both the fixed cap and the switch case, the cavity accommodating switch components used by the electromagnetic switch, the switch components including a pair of fixed contacts disposed inside the cap, each of the fixed contacts being integrally secured to each of the two terminals;

a movable contact movably disposed in the cavity to face the pair of fixed contacts; and an excitation coil disposed within the switch case to generate a magnetic force necessary for driving the movable contact.

3. The electromagnetic switch according to claim 2, wherein the cap has a pair of terminal holders individually holding the two terminals, at least one of the terminal holders being disposed to outwardly protrude from the outer surface of the cap in a radial direction thereof.

4. The electromagnetic switch according to claim 3, wherein the cap has a connector portion holding a current-supply terminal to supply current to the excitation coil, the connector portion being disposed to outwardly protrude from the outer surface of the cap in the radial direction thereof.

5. The electromagnetic switch according to claim 4, wherein the distal end of the cylindrical open end of the switch case is configured to be wound up by inserting a dedicated tool into the groove in the radial direction.

6. The electromagnetic switch according to claim 5, wherein the distal end of the cylindrical open end of the switch case is wound up around the groove so that the distal end is bent along a side surface of the groove with no aperture between the distal end and the side surface.

7. The electromagnetic switch according to claim 2, wherein the cap has a connector portion holding a current-supply terminal to supply current to the excitation coil, the connector portion being disposed to outwardly protrude from the outer surface of the cap in a radial direction thereof.

8. The electromagnetic switch according to claim 7, wherein the distal end of the cylindrical open end of the switch case is configured to be wound up by inserting a dedicated tool into the groove in the radial direction.

9. The electromagnetic switch according to claim 2, wherein the distal end of the cylindrical open end of the switch case is configured to be wound up by inserting a dedicated tool into the groove in the radial direction.

* * * * *